(12) United States Patent
Kakadia

(10) Patent No.: US 7,107,327 B2
(45) Date of Patent: Sep. 12, 2006

(54) METHOD AND APPARATUS FOR DETERMINING A SERVER CONFIGURATION BASED ON AN EXECUTION PROFILE OF AN APPLICATION

(75) Inventor: Deepak Kakadia, Union City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 738 days.

(21) Appl. No.: 10/133,608

(22) Filed: Apr. 26, 2002

(65) Prior Publication Data

US 2003/0204594 A1 Oct. 30, 2003

(51) Int. Cl.
*G06F 15/177* (2006.01)
(52) U.S. Cl. .................. 709/220; 709/226; 702/186
(58) Field of Classification Search ............. 709/203, 709/220–226; 702/186
See application file for complete search history.

(56) References Cited

U.S. PATENT DOCUMENTS

| | | | |
|---|---|---|---|
| 6,086,618 A * | 7/2000 | Al-Hilali et al. | 709/226 |
| 6,182,109 B1 * | 1/2001 | Sharma et al. | 709/226 |
| 6,711,607 B1 * | 3/2004 | Goyal | 709/226 |
| 6,862,623 B1 * | 3/2005 | Odhner et al. | 709/224 |
| 6,898,564 B1 * | 5/2005 | Odhner et al. | 709/220 |
| 2003/0028642 A1 * | 2/2003 | Agarwal et al. | 709/226 |

* cited by examiner

*Primary Examiner*—David Wiley
*Assistant Examiner*—Phuoc H. Nguyen
(74) *Attorney, Agent, or Firm*—Park, Vaughan & Fleming, LLP

(57) ABSTRACT

One embodiment of the present invention provides a system that facilitates determining server configurations based on an execution profile of an application. During operation, the system analyzes the application to develop an execution profile that specifies the number of times each primitive operation is executed. Next, the system estimates the amount of resources used by the application based on the number of times each primitive operation is executed. Finally, the system determines a server configuration based on the estimated amount of resources used by the application.

11 Claims, 5 Drawing Sheets

| APPLICATION 200 |
|---|
| I1 |
| P1 |
| I2 |
| P2 |
| P1 |
| I3 |
| P3 |
| I4 |
| I3 |
| P3 |

| PRIMITIVE | EXECUTION TIME |
|---|---|
| P1 | 10 ms |
| P2 | 59 ms |
| P3 | 245 ms |

302

| INSTRUCTION | EXECUTION TIME |
|---|---|
| I1 | 1 usec |
| I2 | 9 usec |
| I3 | 5 usec |

FIG. 3

| 1 SERVER - 1 CPU | 400 |
|---|---|
| PRIMITIVE | EXECUTION TIME |
| P1 | 10 ms |
| P2 | 59 ms |
| P3 | 245 ms |

| 1 SERVER - 2 CPU | 402 |
|---|---|
| PRIMITIVE | EXECUTION TIME |
| P1 | 5 ms |
| P2 | 26 ms |
| P3 | 145 ms |

| 1 SERVER - 3 CPU | 404 |
|---|---|
| PRIMITIVE | EXECUTION TIME |
| P1 | 4 ms |
| P2 | 15 ms |
| P3 | 98 ms |

| 1 SERVER - 4 CPU | 406 |
|---|---|
| PRIMITIVE | EXECUTION TIME |
| P1 | 3 ms |
| P2 | 11 ms |
| P3 | 79 ms |

| 1 SERVER - 5 CPU | 408 |
|---|---|
| PRIMITIVE | EXECUTION TIME |
| P1 | 2 ms |
| P2 | 8 ms |
| P3 | 57 ms |

| 1 SERVER - 6 CPU | 410 |
|---|---|
| PRIMITIVE | EXECUTION TIME |
| P1 | 2 ms |
| P2 | 7 ms |
| P3 | 46 ms |

FIG. 4

| 1 SERVER - 1 CPU | 500 |
|---|---|
| PRIMITIVE | EXECUTION TIME |
| P1 | 30 ms |
| P2 | - ms |
| P3 | - ms |

| 1 SERVER - 2 CPU | 502 |
|---|---|
| PRIMITIVE | EXECUTION TIME |
| P1 | 22 ms |
| P2 | 96 ms |
| P3 | - ms |

| 1 SERVER - 3 CPU | 504 |
|---|---|
| PRIMITIVE | EXECUTION TIME |
| P1 | 14 ms |
| P2 | 45 ms |
| P3 | 155 ms |

| 1 SERVER - 4 CPU | 506 |
|---|---|
| PRIMITIVE | EXECUTION TIME |
| P1 | 6 ms |
| P2 | 20 ms |
| P3 | 92 ms |

FIG. 5

METHOD AND APPARATUS FOR DETERMINING A SERVER CONFIGURATION BASED ON AN EXECUTION PROFILE OF AN APPLICATION

BACKGROUND

1. Field of the Invention

The present invention relates to servers and computer systems. More specifically, the present invention relates to a method and an apparatus that facilitates determining a server configuration based on an execution profile of an application.

2. Related Art

The recent explosive growth of electronic commerce has led to a proliferation of web sites on the Internet selling products as diverse as toys, books and automobiles, and providing services, such as insurance and stock trading. Millions of consumers are presently surfing through web sites in order to gather information, to make purchases, or purely for entertainment.

The increasing traffic on the Internet often places a tremendous load on the servers that host web sites. Some popular web sites receive over a million "hits" per day. In order to process this much traffic without subjecting web surfers to annoying delays in retrieving web pages, it is necessary to distribute or load balance the traffic between multiple server nodes, so that the multiple server nodes can operate in parallel to process the traffic. In addition, it is extremely important to correctly size each server node to handle the traffic that it will encounter.

Server sizing is usually done by trial and error, if it is done at all. Currently, computer manufacturers publish sizing guides which are, at best, crude estimates based on various computers performing various workloads. Provided that the various vendors are comparing comparable computing device configurations and identical workloads, this model would work well for comparison purposes between vendors. However, currently there is no known tool to assist a customer to find the optimal server configuration for a given application. Typically, vendors try to sell servers which surpass the customers' needs to allow an adequate cushion, but this practice results in a higher overall cost to the customer.

Unanticipated demand over a short period of time can result in an unresponsive or non-functioning server. For example, an unexpected event, such as a news bulletin, might drive the traffic for a certain web application to levels well above average. Current sizing guides do not reveal how a server performs under an intense load for a fixed period of time, nor do they reveal the maximum load the server can handle before it becomes unresponsive. This information is essential in choosing the optimal server configuration for a given application.

What is needed is a method and an apparatus for properly sizing a server configuration based on characteristics of an application that will be running on the server configuration.

SUMMARY

One embodiment of the present invention provides a system that facilitates determining server configurations based on an execution profile of an application. During operation, the system analyzes the application to develop an execution profile that specifies the number of times each primitive operation is executed. Next, the system estimates the amount of resources used by the application based on the number of times each primitive operation is executed. Finally, the system determines a server configuration based on the estimated amount of resources used by the application.

In a variation on this embodiment, the system receives a reference architecture and estimates the amount of resources used by the application based on the reference architecture, wherein the reference architecture specifies an interconnection topology for the server configuration.

In yet another variation, the system executes each primitive operation on the reference architecture to estimate the amount of resources used by each primitive operation.

In yet another variation, the system executes each primitive operation on the reference architecture multiple times and then averages the results to estimate the amount of resources used by each primitive operation.

In a further variation, the system executes each primitive operation on the reference architecture multiple times during a fixed time period and then averages the results to estimate the amount of resources used by each primitive operation.

In another variation on this embodiment, the system receives a list of server configurations.

In a further variation, the system receives a list of server configurations that can specify attributes, such as amount of memory, number of CPUs, and number of servers.

In yet another variation, the system determines the server configuration by making a selection from the list of server configurations.

BRIEF DESCRIPTION OF THE FIGURES

FIG. 2 illustrates an application in accordance with an embodiment of the present invention.

FIG. 3 illustrates execution times for operations in an application in accordance with an embodiment of the present invention.

FIG. 4 illustrates execution times for primitive operations on various server configurations in accordance with an embodiment of the present invention.

FIG. 5 illustrates execution times for primitive operations on various server configurations within a fixed period of time in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Reference Architecture

Figure 1A:
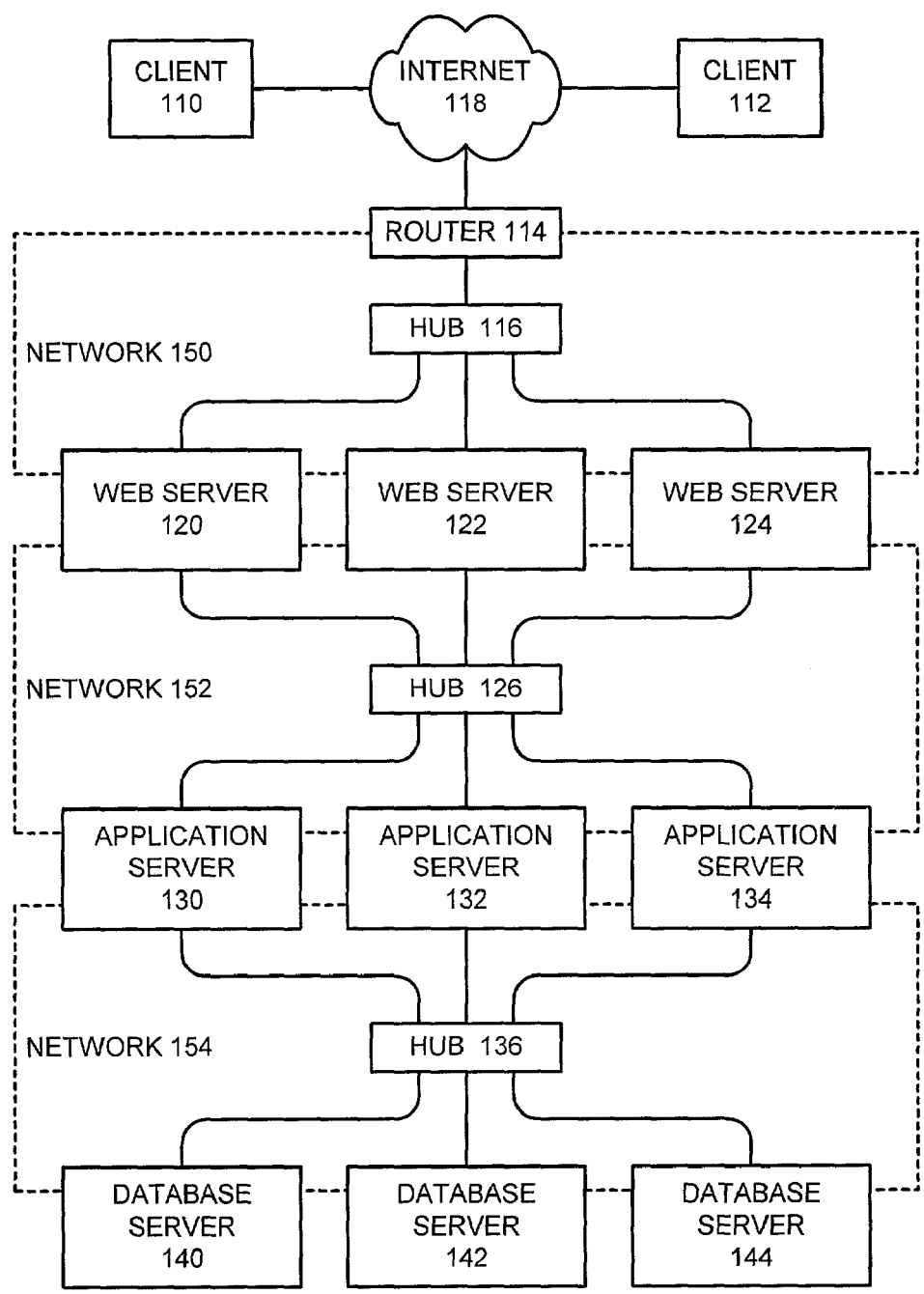
FIG. 1A illustrates a reference architecture for a server-based application in accordance with an embodiment of the present invention.

FIG. 1A illustrates a reference architecture for a server-based application in accordance with an embodiment of the present invention. Reference architecture 100 contains clients 110 and 112 coupled to Internet 118. Clients 110 and 112 can generally include any node on a network including computational capability and including a mechanism for communicating across a network. Web servers 120, 122, and 124 are coupled to hub 116, which is in turn coupled to router 114, thereby creating network 150. Router 114 couples network 150 to Internet 118.

Web servers 120, 122, and 124 are coupled to application servers 130, 132, and 134 via network 152, which includes hub 126. Application servers 130, 132, and 134 are coupled to database servers 140, 142, and 144 via network 154, which includes hub 136.

Note that reference architecture 100 is more secure than most reference architectures as application servers 130, 132, and 134, and database servers 140, 142, and 144 are not exposed to Internet 118. However, reference architecture 100 requires more network administration overhead.

Hubs 116, 126, and 136 can include any device that facilitates communications between devices, such as a switch or a bridge. Router 114 can also contain a firewall.

Second Reference Architecture

Figure 1B:
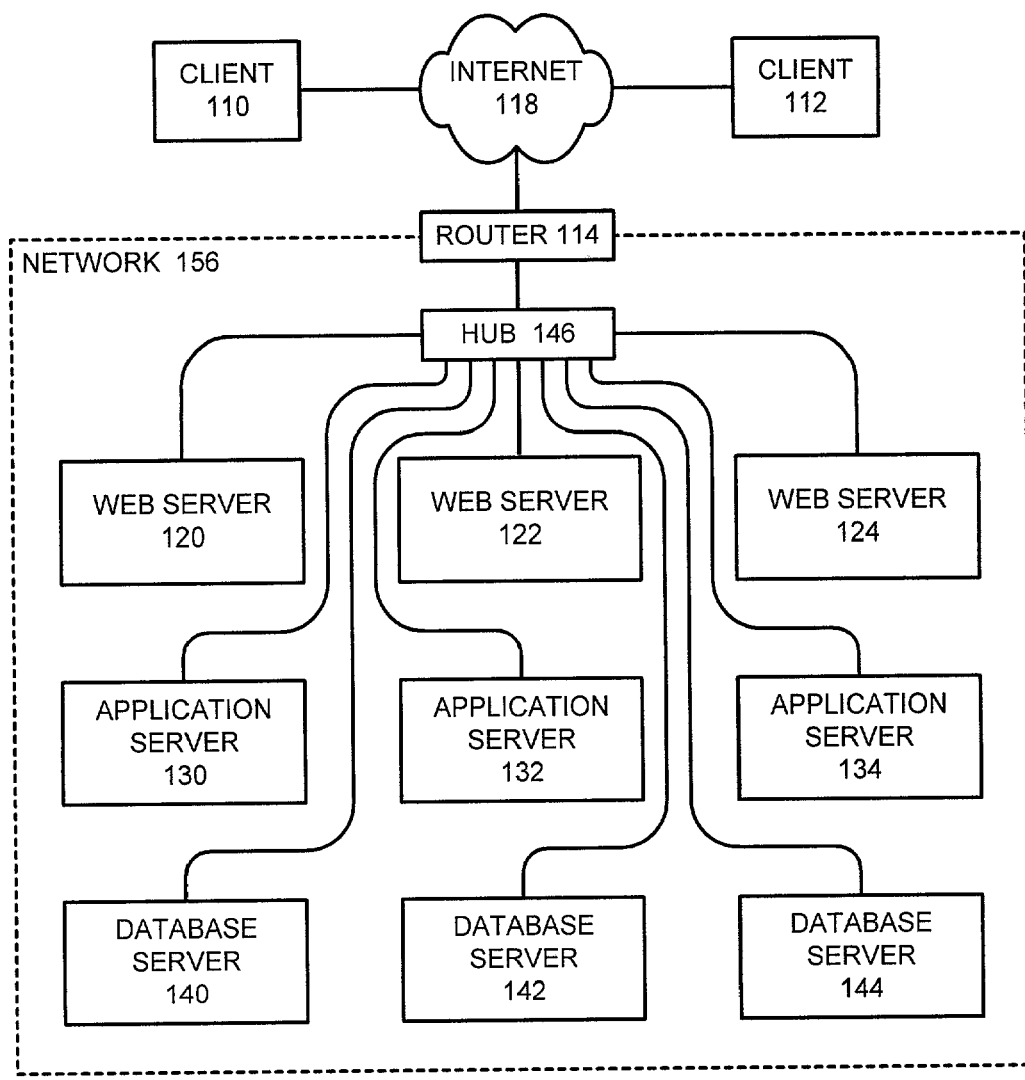
FIG. 1B illustrates a second reference architecture for the server-based application in accordance with an embodiment of the present invention.

FIG. 1B illustrates a second reference architecture for a server-based application in accordance with an embodiment of the present invention. Reference architecture 102 contains clients 110 and 112 coupled to Internet 118. Web servers 120, 122, and 124 are coupled to hub 146, which is in turn coupled to router 114, thereby creating network 156. Router 114 couples network 156 to Internet 118.

Application servers 130, 132, and 134 and database servers 140, 142, and 144 are also coupled to hub 146, and thus, nodes on network 156. Reference architecture 102 is less secure than some reference architectures because application servers 130, 132, and 134, and database servers 140, 142, and 144 are exposed directly to Internet 118. However, reference architecture 102 requires less network administration overhead.

Note that each reference architecture produces different application performance and execution times.

Application

FIG. 2 illustrates an application 200 in accordance with an embodiment of the present invention. Like any computer program, application 200 is made up of various instructions and primitive operations. Application 200 contains instructions I1, I2, I3, and I4, as well as primitive operations P1, P2, and P3. Note that I3, P1, and P3 are executed twice in a typical program execution.

Execution Times

FIG. 3 illustrates typical execution times for operations in an application on a specific reference architecture in accordance with an embodiment of the present invention. Table 300 illustrates the typical execution times for primitive operations P1 to P3. Table 302 illustrates the typical execution times for instructions I1 to I3. Note that the execution times for instructions I1 to I3 are insignificant compared to the execution times for primitive operations P1 to P3. Hence, we can reduce the application to the primitive operations and approximate the instructions with negligible error.

Execution Times for Various Server Configurations

FIG. 4 illustrates primitive operation execution times for various server configurations on a specific reference architecture in accordance with an embodiment of the present invention. Table 400 illustrates the average execution times for primitive operations P1 to P3 based on a server with one CPU. Tables 402, 404, 406, 408, and 410 illustrate average execution times for primitive operations P1 to P3 based on servers with two CPUs to six CPUs respectively.

Application 200 contains two instances of primitive operation P1, one instance of primitive operation P2, and two instances of primitive operation P3. According to table 400, application 200 takes 10 ms times two, plus 59 ms, plus 245 ms times two, or 569 ms, to execute on a server with one CPU. According to table 402, application 200 takes 326 ms to execute on a server with two CPUs, which represents a decrease of 243 ms.

Performing similar calculations, table 408 specifies an execution time of 126 ms on a server with five CPUs, and table 410 specifies an execution time of 103 ms on a server with six CPUs. The performance benefit between a server with five CPUs and a server with six CPUs is 23 ms. Note that the benefit of adding an additional CPU at one CPU (243 ms) is far greater than the benefit of adding an additional CPU at five CPUs (23 ms). Also note that there is no benefit in the addition of another CPU from five CPUs while executing primitive operation P1.

This information is necessary when determining proper server sizing. The increased performance of an additional CPU might not be sufficient to justify the cost of adding the additional CPU. Based on factors such as hardware costs and space, this information might revel that two servers with three CPUs each might be better than one server with six CPUs.

Execution Times for Various Server Configurations During a Fixed Period

FIG. 5 illustrates primitive operation execution times for various server configurations within a fixed period of time in accordance with an embodiment of the present invention. Table 500 illustrates the average execution times for primitive operations P1 to P3 based on a server with one CPU during a fixed period of time. This reveals the servers capability of handling a 'burst' of activity while executing application 200. Tables 502, 504, and 506 illustrate average execution times for primitive operations P1 to P3 over a fixed period of time based on servers with two CPUs to four CPUs respectively.

Table 500 illustrates that a server with one CPU is insufficient to handle the 'burst' of activity while executing application 200 because primitive operations P2 and P3 fail to execute. For similar reasons, table 502 shows that a server with two CPUs is also insufficient.

Determining a Server Configuration Based on an Application

Figure 6:
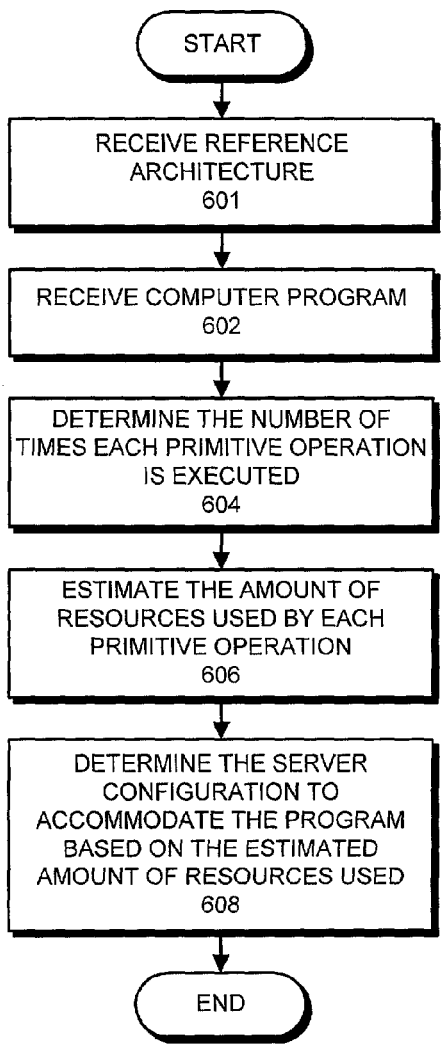
FIG. 6 is a flow chart illustrating the process of determining a server configuration based on an execution profile of an application in accordance with an embodiment of the present invention.

FIG. 6 is a flow chart illustrating the process of determining a server configuration based on an application in accordance with an embodiment of the present invention.

First, the system receives a reference architecture (step 601) and an application (step 602). The system can receive the application in a number of ways. For example, the application can be uploaded directly by the customer to a web site or can be transferred via diskette by a sales advisor. Next, the system determines the primitive operations that are executed and the number of times each primitive operation is executed by the application (step 604). This is accomplished by scanning the source code of the application for primitive operations to create a static execution profile, or by analyzing the compiled code with a analysis tool to create a dynamic execution profile. Then, the system estimates the amount of resources used by each primitive operation (step 606) and determines the server configuration to accommodate the application based on the estimated amount of resources used (step 608).

Benchmarking Primitive Operation Execution Times

Figure 7:
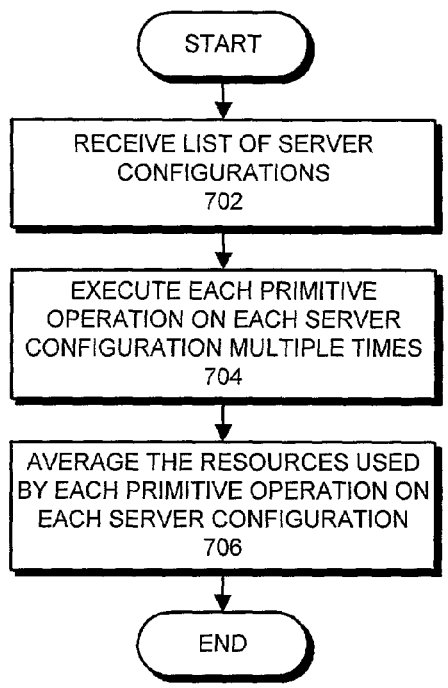
FIG. 7 is a flow chart illustrating the process of benchmarking execution times for primitive operations in accordance with an embodiment of the present invention.

FIG. 7 is a flow chart illustrating the process of benchmarking primitive operation execution times in accordance with an embodiment of the present invention.

The system starts by receiving a list of server configuration (step 702). The list of server configurations can include the list of server configurations available from a vendor, or the list of server configurations that are within the customer's budget. Next, the system executes each primitive operation on each server configuration multiple times (step 704). Then, the system averages the resources used by each primitive operation on each server configuration (step 706).

Note the system can perform step 704 over a fixed period of time to capture the execution times under a 'burst' of activity. Also note that these steps are performed for a given reference architecture.

The foregoing descriptions of embodiments of the present invention have been presented for purposes of illustration and description only.

They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for determining a server configuration to accommodate an application, comprising:

receiving the application;

determining the number of times each primitive operation is executed by the application;

receiving a list of server configurations, wherein each server configuration specifies an interconnection topology for the server configuration;

executing each primitive operation on each server configuration multiple times to estimate the amount of resources used by each primitive operation on each server configuration, wherein executing each primitive operation involves executing each primitive operation n times during a fixed time period, and then averaging the amount of resources used over the n executions, whereby executing each primitive operation n times in a fixed time period estimates the burst response of the server configuration;

estimating the amount of resources used by the application based on the number of times each primitive operation is executed; and determining the server configuration to accommodate the application based on the estimated amount of resources used by the application;

wherein the server configuration is optimized for the execution of the application.

2. The method of claim 1, further comprising receiving a list of server configurations.

3. The method of claim 2, wherein the server configuration can specify:

an amount of memory;

a number of CPUs;

a CPU clock speed; and a number of servers.

4. The method of claim 2, wherein determining the server configuration involves selecting the server configuration from the list of server configurations.

5. A computer-readable storage medium storing instructions that when executed by a computer cause the computer to perform a method for determining a server configuration to accommodate an application, comprising:

receiving the application;

determining the number of times each primitive operation is executed by the application;

receiving a list of server configurations, wherein each server configuration specifies an interconnection topology for the server configuration;

executing each primitive operation on each server configuration multiple times to estimate the amount of resources used by each primitive operation on each server configuration, wherein executing each primitive operation involves executing each primitive operation n times during a fixed time period, and then averaging the amount of resources used over the n executions, whereby executing each primitive operation n times in a fixed time period estimates the burst response of the server configuration;

estimating the amount of resources used by the application based on the number of times each primitive operation is executed; and determining the server configuration to accommodate the application based on the estimated amount of resources used by the application;

wherein the server configuration is optimized for the execution of the application.

6. The computer-readable storage medium of claim 5, further comprising receiving a list of server configurations.

7. The computer-readable storage medium of claim 6, wherein the server configuration can specify:

an amount of memory;

a number of CPUs;

a CPU clock speed; and a number of servers.

8. The computer-readable storage medium of claim 6, wherein determining the server configuration involves selecting the server configuration from the list of server configurations.

9. An apparatus for determining a server configuration to accommodate an application, comprising:

a counting mechanism configured to determine the number of times each primitive operation is executed by the application;

an estimating mechanism configured to estimate the amount of resources used by the application based on the number of times each primitive operation is executed;

a receiving mechanism configured to receive a list of server configurations, wherein each server configuration specifies an interconnection topology for the server configuration;

an executing mechanism configured to execute each primitive operation on each server configuration multiple times to estimate the amount of resources used by each primitive operation, wherein executing each primitive operation involves executing each primitive operation n times during a fixed time period, and then averaging the amount of resources used over the n executions, whereby executing each primitive operation n times in a fixed time period estimates the burst response of the server configuration; and a configuration mechanism configured to determine the server configuration to accommodate the application based on the estimated amount of resources used by the application;

wherein the server configuration is optimized for the execution of the application.

10. The apparatus of claim 9, wherein the configuration mechanism is configured to use a list of different server configurations.

11. The apparatus of claim 10, wherein each server configuration can specify:

an amount of memory;

a number of CPUs;

a CPU clock speed; and a number of servers.

* * * * *